J. M. RAMAGE.
CUSHION TIRE.
APPLICATION FILED NOV. 6, 1919.
1,351,536.
Patented Aug. 31, 1920.
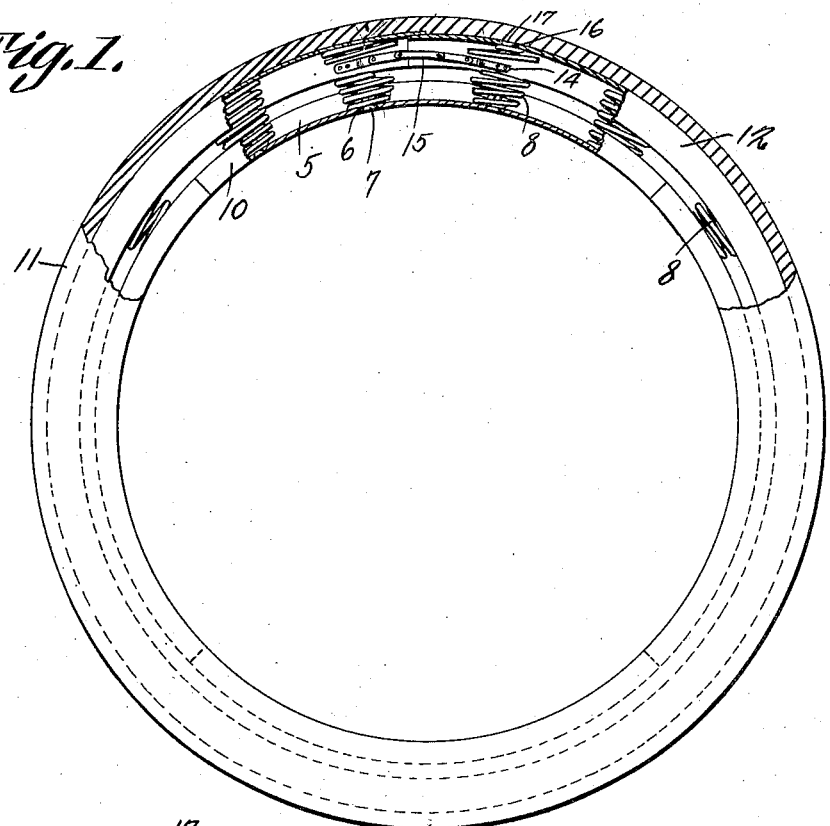
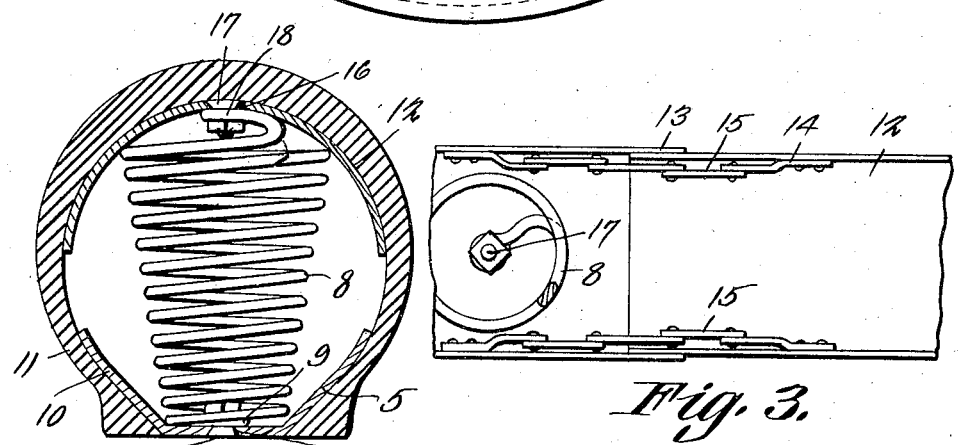
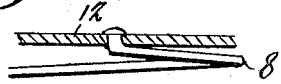
INVENTOR.
John M. Ramage,
BY
ATTORNEY.

UNITED STATES PATENT OFFICE.

JOHN M. RAMAGE, OF UNIONTOWN, PENNSYLVANIA.

CUSHION-TIRE.

1,351,536.   Specification of Letters Patent.   Patented Aug. 31, 1920.

Application filed November 6, 1919. Serial No. 336,151.

*To all whom it may concern:*

Be it known that I, JOHN M. RAMAGE, a citizen of the United States of America, and resident of Uniontown, in the county of Fayette and State of Pennsylvania, have invented certain new and useful Improvements in Cushion-Tires, of which the following is a specification.

This invention relates to cushion tires for vehicles and particularly to tires of the type indicated having springs which absorb shock and vibration, due to the wheels contacting with uneven roadbeds.

An object of this invention is to provide novel means whereby the tread surfaces of wheels may be yieldingly held with relation to the rim of the wheel and means being provided for affording independent movement of sections of the cushioning means with relation to each other.

A further object of this invention is to provide a cushioning device of the character indicated having a yieldable joint and links connecting the ends, said links holding the parts in assembled relation while at the same time affording the said independent movement.

A still further object of this invention is to provide a rim engaging member associated with the tire supporting member and with relation to which the shoe or casing is assembled in order that the whole may be applied to a rim for attachment to a wheel of a vehicle.

With the foregoing and other objects in view, the invention consists in the details of construction, and in the arrangement and combination of parts to be hereinafter more fully set forth and claimed.

In describing the invention in detail, reference will be had to the accompanying drawing forming part of this specification wherein like characters denote corresponding parts in the several views, and in which—

Figure 1 illustrates a view in elevation partly in section illustrating a tire embodying the invention;

Fig. 2 illustrates a cross sectional view;

Fig. 3 illustrates a plan view of the inner side of the outer spring engaging member; and Fig. 4 illustrates a sectional view illustrating a modified anchorage for the springs.

In these drawings 5 denotes a sectional channel iron of proper size for the wheel to which it is to be applied, the same having a series of apertures 6 each of which is for the reception of a fastening such as a bolt by which a spring 8 is anchored in place, the said spring in the present embodiment of the invention terminating in an eye 9 for the reception of such fastening. The fastening 7 has its head countersunk as shown so that it lies flush with the inner surface of the channel iron. The flanges 10 of the channel iron are flared slightly to the contour of the shoe or casing 11 which is applied to it.

The tread surface of the shoe or casing is engaged by an annular laterally and longitudinally curved plate 12 shaped to the contour of the inner surface of the said shoe or casing, and the ends of the plate overlap each other as at 13 a sufficient distance to preclude their disengagement when the same are flexed in operation, but the said ends are held in operative relation to each other by being supplied with arms such as 14 having links 15 pivotally connected to them, it being shown in Fig. 3 that a series of links extend from one arm to another on each side. As the links are on the inside of the plate, they do not interfere with the shoe or casing or other operating parts of the device.

The plate 12 has a series of apertures such as 16 for the reception of fastenings 17 similar to the fastening 7 and the outer ends of the springs have eyes 18 to receive the fastenings so that the springs are anchored to the said plate. The convolutions of the springs are of increased diameter at their outer ends as compared with those at the inner ends and the convolutions at the outer ends of the springs on each side bear against the plate so that more stability is afforded and undue oscillation of the springs is prevented when the tire is under lateral strain.

If desired, the ends of the springs may be extended through the inner and outer plates and the said ends upset to afford an anchorage as shown in Fig. 4, and under most conditions, this would be a satisfactory arrangement and would save in the parts and reduce the number of joints.

I claim:

In a cushion tire, a plate longitudinally and laterally curved having its ends overlapping to form a casing support, arms secured to the plate near each end, the said arms being arranged near opposite edges of the said plate, the arms at one end of the plate projecting toward the arms near the opposite end of the plate, sets of links, the links of each set being pivotally connected, means for pivotally connecting the end links of each set to the oppositely disposed arms of the plate for flexibly connecting the two sets of arms, and means for yieldingly supporting the plate.

J. M. RAMAGE.